United States Patent [19]

Boike et al.

[11] Patent Number: 5,555,301
[45] Date of Patent: Sep. 10, 1996

[54] POWER SUPPLY APPARATUS AND METHOD FOR ENERGIZING TELEPHONE ALERTING MECHANISMS AND CIRCUITRY

[75] Inventors: Barry Boike, Cullman; David H. Nabors, Huntsville, both of Ala.

[73] Assignee: Motorola, Inc., Schaumburg, Ill.

[21] Appl. No.: 360,916

[22] Filed: Dec. 21, 1994

[51] Int. Cl.$^6$ ................................... H04M 19/00
[52] U.S. Cl. .................. 379/413; 379/418; 379/322; 379/324
[58] Field of Search ................................ 379/413, 418, 379/373, 322, 323, 324

[56] References Cited

U.S. PATENT DOCUMENTS

| | | | |
|---|---|---|---|
| 4,071,879 | 1/1978 | Falk | 379/322 |
| 5,175,764 | 12/1992 | Patel et al. | 379/322 |
| 5,381,472 | 1/1995 | Kobayashi et al. | 379/322 |
| 5,396,555 | 3/1995 | Shibata et al. | 379/413 |
| 5,459,788 | 10/1995 | Kim | 379/413 |

OTHER PUBLICATIONS

"Telephone Ring Generator", Clive Bolton, Electronic Design, Feb. 21, 1994.
"Electrical Characteristics of Bell System Network Facilities at the Interface with Voiceband Ancillary and Data Equipment", PUB 47001, Bell System Communications, Aug. 1976.
"Technical Interface Reference Manual for Customer Equipment", General Telephone, Dec. 1976.

Primary Examiner—Jeffery Hofsass
Assistant Examiner—Jacques M. Saint-Surin
Attorney, Agent, or Firm—Nancy R. Gamburd

[57] ABSTRACT

In a digital data communications device for use in an ISDN environment, a power supply apparatus and method are provided for energizing telephone danger circuitry or other alerting mechanisms. Embodiments of the present invention employ signal generators which control switching circuitry that converts a low voltage DC power source into a low voltage alternating current. A step-up transformer is used to convert or transform this low voltage into a high voltage alternating current, which is rectified and filtered to generate a high voltage direct current. The signal generators also control the switching circuitry which applies this high voltage direct current to an alerting mechanism and alternately provides a path to discharge energy which may be stored in the alerting mechanism, causing the alerting mechanism or other ringer circuitry to resound.

30 Claims, 4 Drawing Sheets

POWER SUPPLY APPARATUS AND METHOD FOR ENERGIZING TELEPHONE ALERTING MECHANISMS AND CIRCUITRY

FIELD OF THE INVENTION

This application relates to data communications devices including, but not limited to, terminal adapters that provide or supply power for energizing one or more telephone alerting mechanisms, such as telephone ringer circuitry.

BACKGROUND OF THE INVENTION

In an analog telephone line environment, the telephone company central office supplies a ring voltage of approximately 90 volts alternating current (AC) to activate an alerting mechanism on the analog telephone to an incoming call. The ring voltage is applied to the two incoming telephone lines, known as the "tip" and the "ring", and causes the analog telephone to ring (or provide some other type of indication of the incoming call) until the handset is removed and the telephone goes off hook.

This 90 volt AC ring voltage is not supplied by the telephone company in an Integrated Services Digital Network (ISDN) line environment. When a data packet notifies an ISDN data communications device (DCD) of an incoming call, the DCD should generate a ring voltage to activate the alerting mechanism. Existing power supplies used to generate such ring voltages include sources such as high voltage direct current (DC) converters, power supplies, and batteries for supplying a high voltage direct current. The high voltage direct current may then be coupled to the tip and ring through a switch that alternately exchanges the polarity to the tip and ring at the specified ring frequency, thereby applying a high voltage alternating current to the alerting or ringing mechanism. In other existing devices, the high voltage direct current is coupled to the tip and ring alternately with a ground voltage, to cause a reversal of current flow through the ringing mechanism at the specified ring frequency.

Existing methods and apparatus for generating ring voltages tend to have a low efficiency, which may both waste energy and require additional heat sinks and other means for heat dissipation on the printed circuit board. In addition, the existing methods and apparatus may require additional parts, with corresponding additional and significant board space, having a further consequence of adversely impacting both the cost and ease of manufacture of the ISDN data communications device. A need has continued to exist to provide a more energy efficient and compact apparatus and method to provide a ring voltage in data communications devices in an ISDN line environment, which also may be manufactured efficiently and economically.

DESCRIPTION OF THE PREFERRED EMBODIMENT

The present invention concerns various methods and apparatus for energizing telephone ringer circuits. The various embodiments of the present invention have been implemented to provide more energy efficient and compact power supplies for energizing ringer circuitry. These various embodiments have the additional advantage of employing fewer parts than existing power supplies, thereby preserving board space, reducing the costs associated with additional parts, and further providing for more efficient and economical manufacture.

Embodiments of the present invention employ various signal generators which control the switching circuitry that converts a low voltage DC power source into a low voltage alternating current. A step-up transformer is used to convert or transform this low voltage into a high voltage alternating current, which is rectified and filtered to generate a high voltage direct current. The signal generators also control the switching circuitry which alternately applies this high voltage direct current to an alerting mechanism, such as a ringer circuit, and provides a path to discharge energy which may be stored in the alerting mechanism, causing the alerting mechanism or other ringer circuitry to resound.

Figure 1:
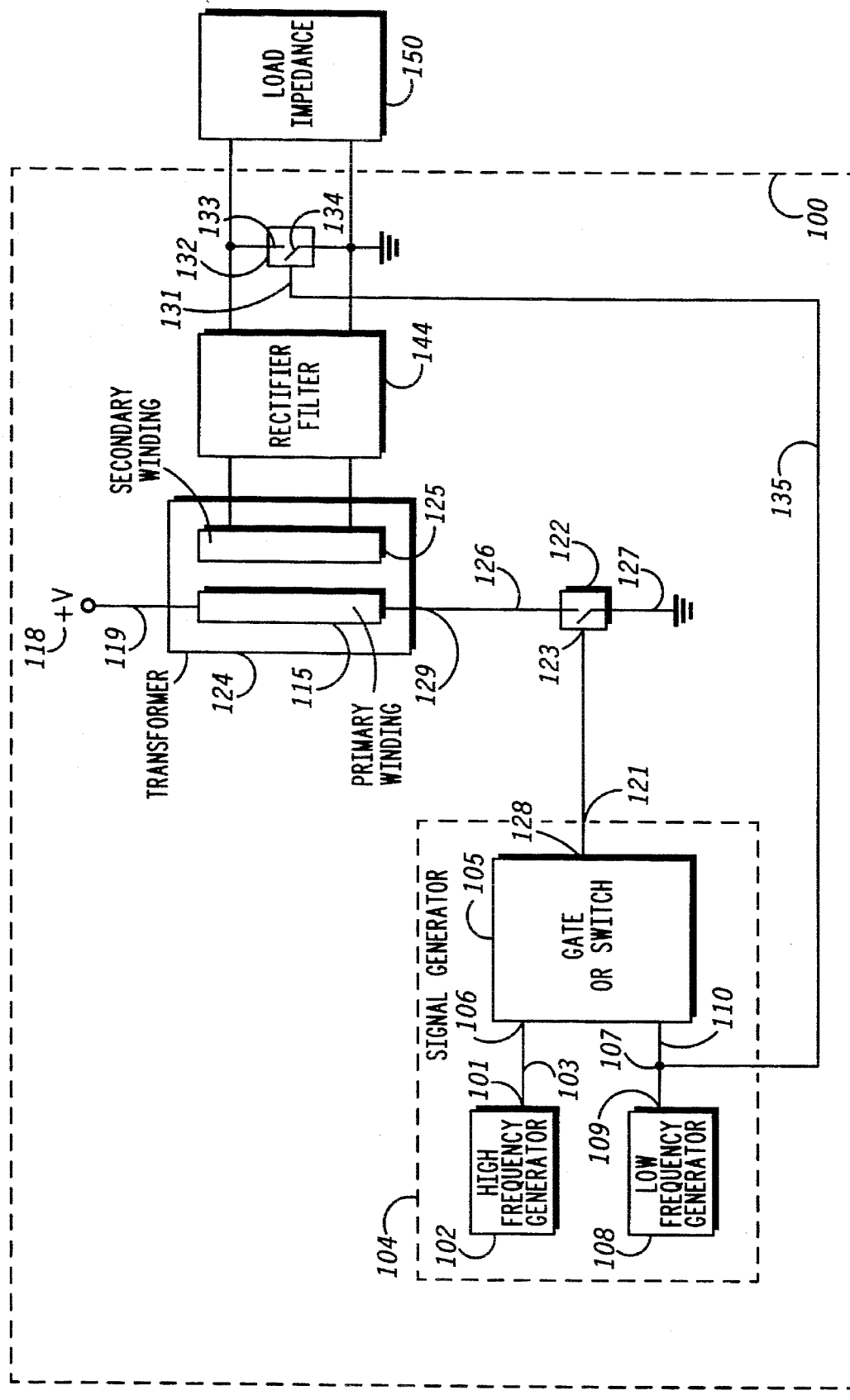
FIG. 1 is a block diagram illustrating a power supply apparatus for energizing an alerting mechanism, such as a telephone ringer circuit, in accordance with an embodiment of the present invention.

FIG. 1 is a block diagram illustrating a power supply apparatus 100 that, when coupled to a DC power supply or source 118, may provide power to energize (cause to ring) a plurality of alerting mechanisms, such as telephone ringer circuits, ringers, chimes, or bells (collectively referred to as alerting mechanisms), any and all of which may be represented by a load impedance 150. The load impedance 150 itself may be further represented by a series arrangement of an inductor and resistor, which are then in parallel with a capacitor. Because the value of the inductive impedance tends to be dominant in such ringer or alerting circuitry, the load impedance 150 is primarily an inductive load.

Referring to FIG. 1, a signal generator 104 is coupled via line 121 to a first switch 122 (also referred to as a control switch) and further coupled via line 135 to a second switch 132 (also referred to as a reversing switch). The signal generator 104 has a high frequency generator 102 and a low frequency generator 108. When energized, the high frequency generator 102 has a high frequency signal at its output 101, and the low frequency generator 108 has a low frequency signal at its output 109. The output 101 of the high frequency generator 102 is coupled via line 103 to a first input 106 (of a plurality of inputs) of a switch or gate 105 (such as an AND gate), with the output 109 of the low frequency generator 108 coupled via line 107 to a second input 110 of the gate 105. The gate (or switch) 105 generates a control signal 220 (see FIG. 2) at its output 128 in response to the high frequency signal and the low frequency signal inputs. The control signal 220 is coupled via line 121 from the output 128 to the control terminal 123 of the switch 122, and controls the opened or closed status of the switch 122. The switch 122 has means to open and close in response to the control signal 220 which are well known by those skilled in the art. For example, depending upon the type of switch, such means may include mechanisms for physically engaging or separating the switch contacts or relay terminals, or for otherwise varying the impedance across the switch electrodes, terminals or contacts, such as varying the impedance in the channel between source and drain electrodes of a field effect transistor (FET) through the application of a sufficient voltage at the gate electrode (control terminal).

Continuing to refer to FIG. 1, a transformer 124 having a primary winding 115 and a secondary winding 125 is used to transform a low voltage alternating current (AC) to a high voltage alternating current. A first terminal 127 of the switch 122 is coupled to a common ground or other reference voltage, and the other (second) terminal 126 of the switch is coupled to a first terminal (or end) 129 of the primary winding 115. A second terminal (or end) 119 of the primary winding 115 may be coupled to a low voltage direct current source 118 or any other low voltage DC power supply. In the presence of (or when coupled to) such a low voltage DC source 118, and when the contacts of the switch 122 open and close in response to the control signal 220, a low voltage alternating current is generated in the primary winding 115. Because the transformer 124 has a step-up turns ratio, the low voltage alternating current in the primary winding 115 effectively induces a high voltage alternating current (or high voltage rectified current) across the terminals of the secondary winding 125. In this manner, the low voltage alternating current is generated from the low voltage direct current source, and the low voltage alternating current is converted or transformed into a high voltage alternating current.

A rectifier filter 144 is coupled in a parallel arrangement across the terminals of the secondary winding 125 of the transformer 124. The high voltage alternating current induced in the secondary winding 125 is rectified and filtered by the rectifier filter 144, thereby effectively generating a high voltage direct current. Because of the rectification and filtering, and depending upon the load impedance 150, the actual voltage wave form appearing across the secondary winding 125 may have a variety of shapes or forms and, because of the rectification, may not be "alternating" in a strict sense. Due to the rectification shown in the preferred embodiments, the actual voltage wave forms appearing across the secondary winding, and possibly also reflected to the primary winding, may, in fact, have DC average values or other DC components. As a consequence, no limitation is intended, nor should any be implied, from the use of AC and DC terminology herein, on the actual voltage wave forms which may appear during actual use of embodiments of the present invention.

This high voltage direct current, provided from the transformation, rectification and filtering referred to above, is further coupled in a parallel arrangement to the reversing (second) switch 132, which is also couplable in a parallel arrangement to the load impedance 150, such as a ringer circuit or other alerting mechanism. The reversing switch 132 is responsive to a reversing switch signal, which may be the same as (or essentially similar to) the low frequency signal, or which may be an inverted low frequency signal (such as signal 260 in FIG. 2). Similarly to the operation of the control switch 122 (being responsive to the control signal 220), this second (reversing) switch 132 has similar means to open and close in response to the reversing switch signal, such as through varying the impedance in the channel between the source and drain electrodes by applying a voltage at the gate electrode, for example, when the reversing switch is implemented as a field effect transistor (FET 332 in FIG. 3). During the positive half of the period of the low frequency signal, the reversing switch contacts 133 and 134 are open and the high voltage direct current power source furnishes energy to the load impedance 150, a portion being inductively stored in the load impedance and another portion causing the alerting mechanism to resound. When the positive half of the period of the low frequency signal is finished and the negative half of the period begins, the contacts 133 and 134 of the reversing switch 132 are closed, thereby forming a discharge path for the inductively stored energy. Simultaneously (during the negative half of the period), the control signal 220 causes the contacts of the switch 122 to open, thereby terminating the flow of the low voltage alternating current in the primary winding, and further causing the voltage across the secondary winding to have a value of essentially zero volts. One cycle of the alerting mechanism charge and discharge cycle is then complete and, in this manner, the power supply has alternately furnished energy to and discharged energy from a connected or coupled alerting mechanism (ringer circuit). When the positive half of the period of the low frequency signal resumes, this alternating ringer charge/discharge cycle repeats and continues until the signal generator is turned off or the ringer power supply is otherwise disabled.

Figure 2:
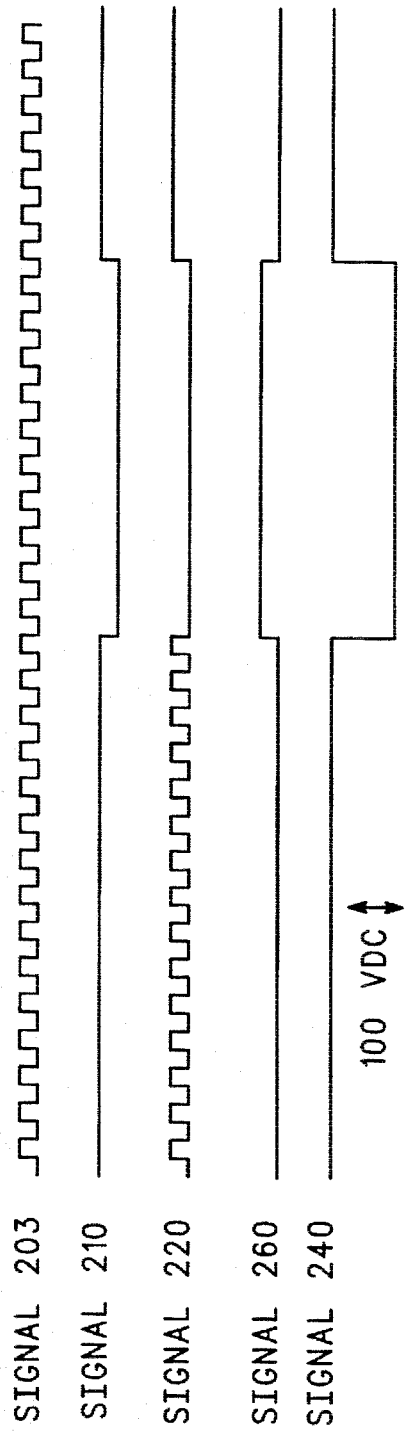
FIG. 2 is a diagram illustrating various representative signals which may occur within a power supply apparatus for energizing an alerting mechanism, such as a telephone ringer circuit, in accordance with an embodiment of the present invention.
Figure 3:
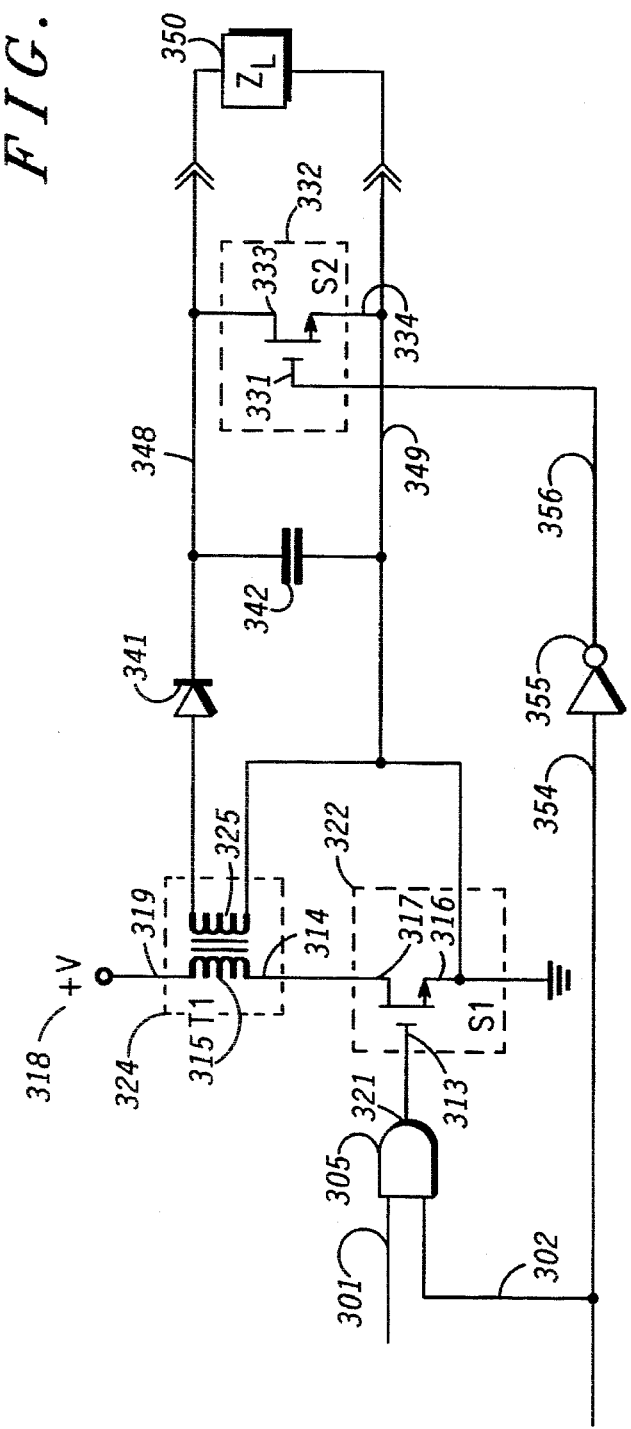
FIG. 3 is a schematic diagram illustrating a power supply apparatus for energizing an alerting mechanism, such as a telephone ringer circuit, in accordance with the preferred embodiment of the present invention.

FIG. 2 illustrates the timing of several representative signals referred to in FIG. 1 and FIG. 3. The various signals illustrated are not drawn to scale, and are illustrated only as examples and for ease of explanation. The signals (illustrated as square waves) are also not limited to any particular wave shapes (e.g., square, sinusoidal, etc.). A high frequency signal 203 and a low frequency signal 210 are coupled to inputs of the gate 105 (in FIG. 1) and gate 305 (in FIG. 3). The high frequency signal 203 may have a range of frequencies, typically from 1 kHz to 1 MHz. The low frequency signal 210 may also have a range of frequencies, typically from 1 Hz to 100 Hz. In the preferred embodiment, the high frequency signal 203 is 20 kilohertz and the low frequency signal 210 is 20 hertz. The high frequency signal and the low frequency signal may also be generated in a microprocessor by methods well known to those skilled in the art. The output of the gate 105 is the high frequency signal gated by the low frequency signal, thereby forming the control signal 220. Reversing switch signal 260 is illustrated, in the example shown in FIG. 2, as the inverse of the low frequency signal 210. The voltage appearing across lines 348 and 349 of FIG. 3 is illustrated as signal 240, shown as a square voltage wave alternating between a high voltage DC level and a zero volt DC level.

FIG. 3 is a schematic diagram of the preferred embodiment of the present invention. As in FIG. 1, the high frequency signal 203 is input on line 301, and the low frequency signal 210 is input on line 302, to a gate 305 (in this case, an AND gate). The gate 305 provides the control signal 220 on the gate output 321, which is coupled to a control terminal (in this case, gate electrode 313) of the first switch 322 for selectively opening and closing the first switch 322. The first switch 322 has a first terminal 316 coupled to a ground or other reference voltage, and a second terminal 317 coupled to a first end (or terminal) 314 of the primary winding 315 of the transformer 324. The second end (or terminal) 317 of the primary winding 315 may be coupled to a low voltage direct current source 318 having a value, for instance, of +12 volts DC. In the preferred embodiment, switch 322 is a MOSFET (or other field effect transistor (FET)) having a gate electrode (control terminal) 313, and source and drain electrodes (which, depending upon the type of FET, may be either of the first and second terminals 316 and 317). When the control signal 220 is applied to the gate electrode 313, the impedance of the n-type or p-type channel between the source and the drain electrodes varies, and alternately appears as a high impedance (an open switch) and a low impedance (a closed switch). When the transistor is connected in a series arrangement with the low voltage direct current source 318 and the primary winding 315, the variation of the impedance has a switching effect which causes an alternating current to flow in the primary winding 315. Those skilled in the art would recognize that an electromechanical relay, a solid state switch, another type of transistor or similar device could be used instead of the MOSFET employed in the preferred embodiment illustrated in FIG. 3.

The transformer 324 illustrated in FIG. 3 has a step-up ratio of 8.33:1 in the preferred embodiment, resulting in a high voltage alternating current having a peak value of approximately 100 volts across the terminals of the secondary winding 325. Design characteristics of the transformer 324 may require a primary winding inductance high enough to avoid saturation during the on (closed) time of switch 322. The transformer 324 is preferably connected in a flyback mode (such that current in the primary winding 315 is out of phase with current in the secondary winding 325), thereby providing current limit protection in the event of a short circuited output. When the transformer is connected in the flyback mode, the maximum peak current of the primary winding 315 may be determined primarily by the low voltage DC input 318, the inductance of the primary winding 315, and the period of the high frequency signal 203. For example, if the low voltage DC source 318 is 12 volts DC, the inductance of the primary winding 315 is 85 microhenries, and if the high frequency signal 203 is 20 kilohertz, then the maximum peak current is approximately 3.5 amperes. The MOSFET, transistor or other device used for switch 322 may then be selected based on the maximum peak current and other engineering design considerations.

Continuing to refer to FIG. 3, in the preferred embodiment, the rectifier filter consists of a diode 341 and a capacitor 342. The diode 341 is used to rectify the high voltage alternating current across the secondary winding 325, and the capacitor 342 is used to filter this rectified voltage, thereby generating a high voltage direct current across lines 348 and 349 as a power source for the load impedance 150. In the preferred embodiment, the capacitor 342 is 10 microfarads. This high voltage direct current power source across lines 348 and 349 energizes the load impedance 350 (such as a telephone ringer) with a positive polarity voltage, causing current to flow in a positive direction (flowing downward in the load 350, as illustrated in FIG. 3). The low frequency signal 210 is coupled via line 354 to an inverter 355, resulting in a reversing switch signal 260 that is coupled via line 356 to the control terminal (gate) 331 of the reversing switch 332. The other terminals 333 and 334 of the reversing switch 332 are connected across lines 348 and 349 and across the load impedance 350 to provide a short circuit path for inductive energy stored in the load when the reversing switch 332 is closed. As in the case of the control switch 322, a field effect transistor, such as a MOSFET, may be used in the preferred embodiment to provide the reversing switch 332 function. Reversing switch 332 provides a discharge path for energy that is inductively stored in the load impedance during the positive direction of current flow. As mentioned above in reference to FIG. 1, the discharge path directs current to flow in a negative direction in the load impedance in the second portion of the cycle of the low frequency signal, discharging the energy which may have been stored. Also when the reversing switch is closed, the control signal 220 has opened switch 322, thereby terminating current flow in the primary winding 315 and consequently terminating the high voltage direct current and reducing the voltage across the secondary winding 325 of the transformer 324 to effectively zero volts.

Figure 4:
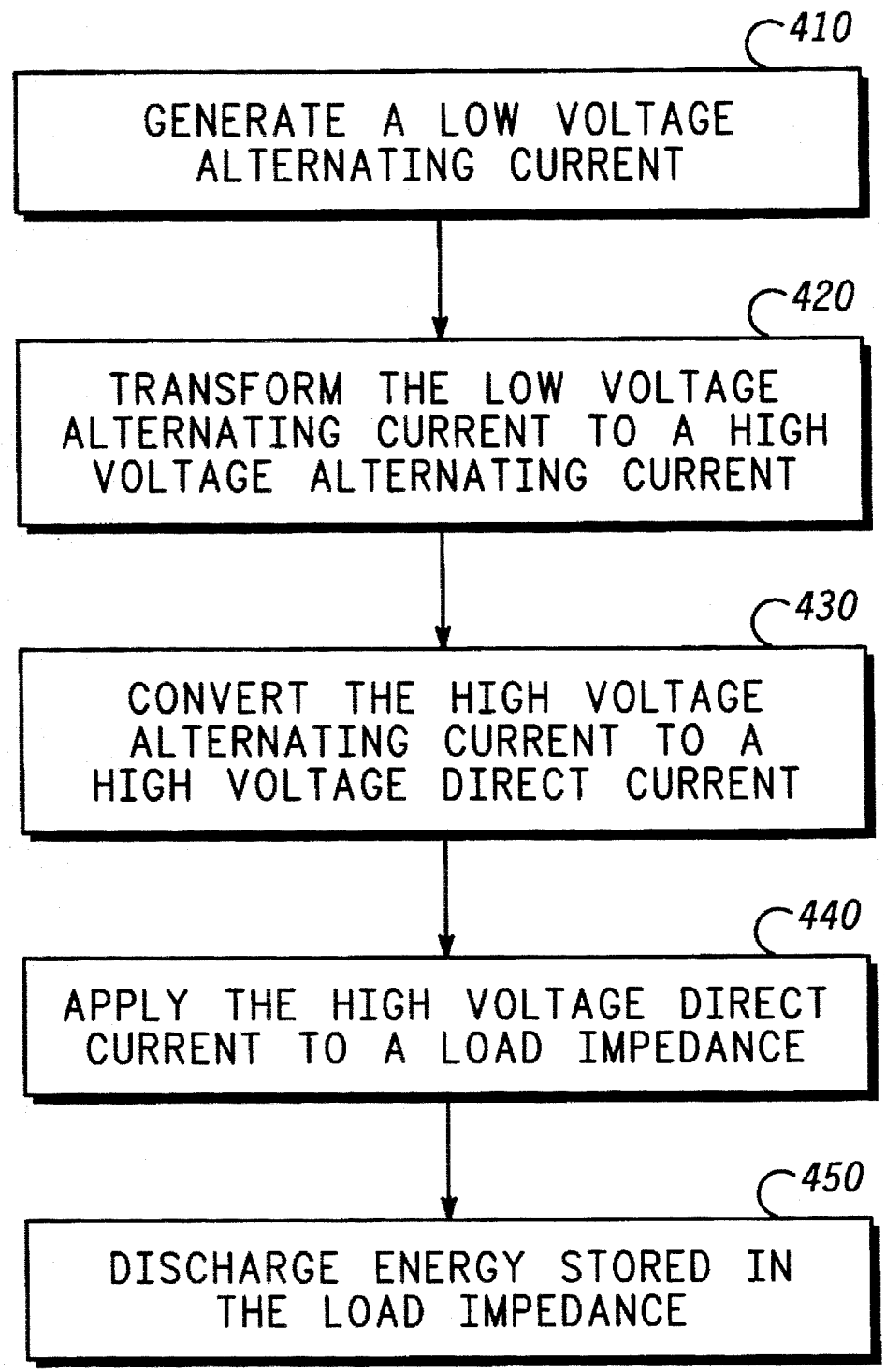
FIG. 4 is a flow diagram illustrating a power supply method for energizing an alerting mechanism, such as a telephone ringer circuit, in accordance with an embodiment of the present invention.

FIG. 4 is a flow chart illustrating a method in accordance with the present invention. In the first step 410, a low voltage alternating current is generated from a low voltage DC source. In the preferred embodiment, step 410 is accomplished in the primary winding 315 of the transformer, by using a switch 322 responsive to a control signal 220. The control signal 220 renders the switch 322 alternately open or closed, causing current to alternatingly flow or not flow in the primary winding, and thereby creating an alternating current. The low voltage alternating current is then transformed to a high voltage alternating current, step 420. In the preferred embodiment, step 420 is accomplished through use of the transformer 324. The high voltage alternating current is converted into a high voltage direct current, step 430. Step 430 is accomplished in the preferred embodiment through the use of the rectifier filter, comprised of the diode 341 and the capacitor 342. Next, in step 440, the high voltage direct current is applied to the load impedance for a first duration (or first period of time, such as for the first half of the period of the low frequency signal) to provide energy to the load impedance. Following this first period of time, a discharge path is provided for a second duration (or period of time, such as for the second half of the period of the low frequency signal) to discharge any energy stored in the load impedance, step 450. In this manner, the alerting mechanism (represented by the load impedance 350) is alternately supplied with a high voltage direct current and supplied with an energy discharge path.

Figure 5:
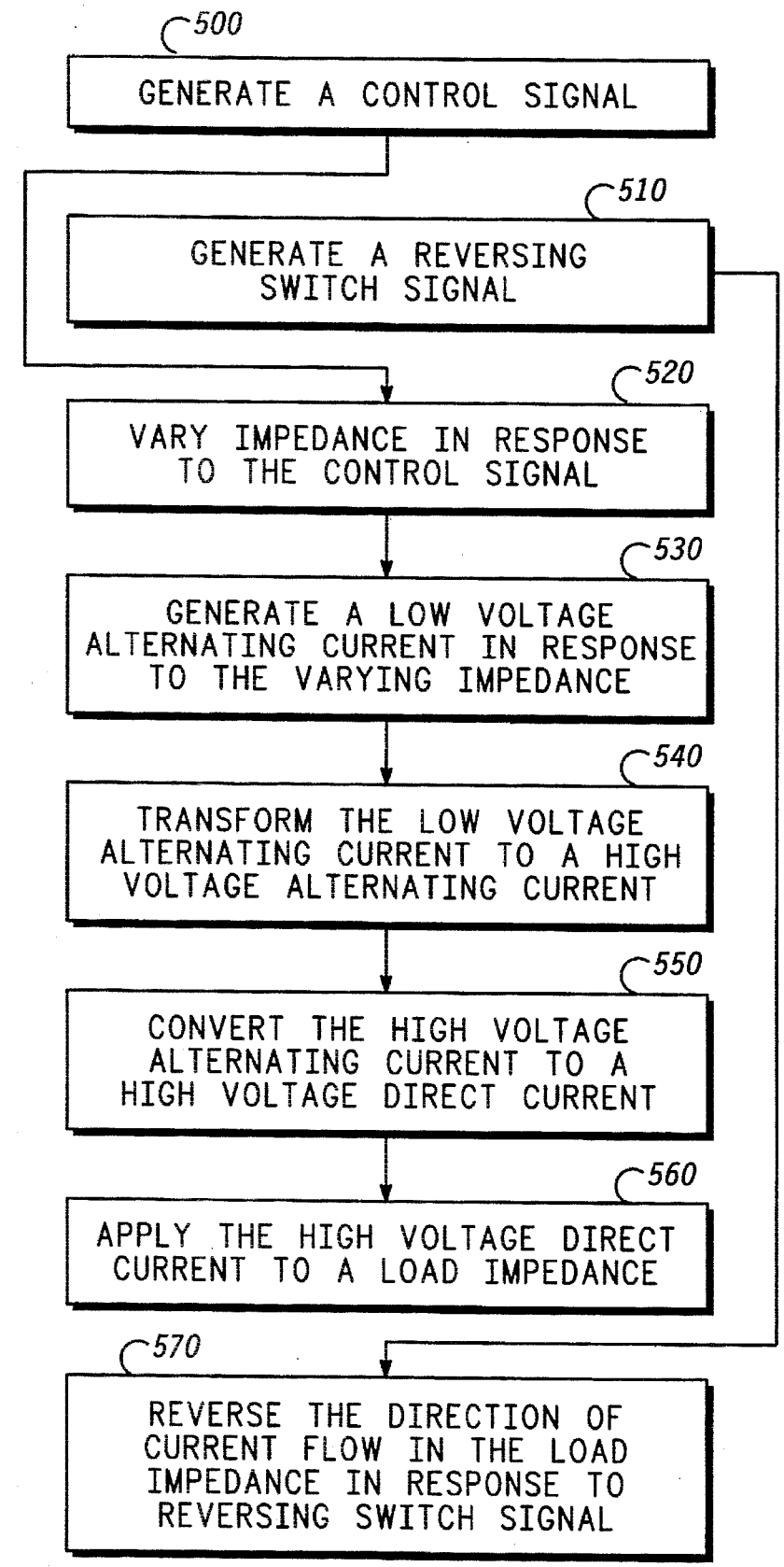
FIG. 5 is a flow diagram illustrating a power supply method for energizing an alerting mechanism, such as a telephone ringer circuit, in accordance with the preferred embodiment of the present invention.

FIG. 5 is an exemplary flow chart illustrating in greater detail the method of the preferred embodiment of the present invention. In step 500, the control signal 220 is generated. In the preferred embodiment, step 500 is accomplished through the logical ANDing (or other similar gating) of the high frequency signal 203 with the low frequency signal 210. In step 510, the reversing switch signal 260 is generated, preferably by inverting the low frequency signal 210. Following generation of the control signal, an impedance is varied in response to the control signal, step 520. In the preferred embodiment, the impedance of the channel between source and drain electrodes is varied by applying a voltage to the gate electrode of the FET employed as a switch. A low voltage alternating current is then generated in response to the varying impedance, step 530, preferably in the primary winding 315, as discussed previously. The low voltage alternating current is transformed to a high voltage alternating current voltage in step 540, preferably by the transformer 324. Next, the high voltage alternating current is converted to a high voltage direct current, step 550 and applied to a load impedance, step 560. In the next step 570, the direction of current flow in the load impedance is reversed, in response to the reversing switch signal 260, preferably through use of the reversing switch 332.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A power supply apparatus in a data communications device for energizing telephone alerting mechanisms, the data communications device capable of receiving an incoming telephone call for transmitting data, the power supply apparatus being couplable to a low voltage direct current source to provide energy to the power supply apparatus, the power supply apparatus further couplable to a telephone alerting mechanism, the power supply apparatus comprising:

a signal generator, the signal generator when energized producing a control signal and a reversing switch signal in response to the incoming telephone call;

a first switch coupled to the signal generator, the first switch having a control terminal to open and close the first switch in response to the control signal, the first switch having a first terminal and a second terminal, the first terminal coupled to a common ground;

a transformer having a primary winding and a secondary winding, the primary winding having a first end and a second end, the first end of the primary winding couplable to the low voltage direct current source, the second end of the primary winding coupled to the second terminal of the first switch, such that in the presence of the low voltage direct current source, the opening and closing of the first switch generates a time varying current in the primary winding and thereby inducing a high voltage alternating current across the secondary winding;

a rectifier filter coupled in parallel to the secondary winding to produce a high voltage direct current in the presence of the high voltage alternating current across the secondary winding; and a second switch coupled to the signal generator, further coupled to the rectifier filter and couplable to an alerting mechanism, the second switch further having a control terminal to open and close the second switch in response to the reversing switch signal, thereby providing the high voltage direct current to the alerting mechanism and alternately discharging energy from the alerting mechanism.

2. The power supply apparatus of claim 1, wherein the signal generator comprises:

a high frequency generator having an output providing a high frequency signal;

a low frequency generator having an output providing a low frequency signal; and a gate having a first input coupled to the high frequency generator output, having a second input coupled to the low frequency generator output, the gate further having a gate output providing the control signal.

3. The power supply apparatus of claim 2, wherein the reversing switch signal is the inverse of the low frequency signal.

4. The power supply apparatus of claim 2, further comprising:

an inverter having an input coupled to the low frequency generator output, the inverter further having an output providing the reversing switch signal.

5. The power supply apparatus of claim 2 wherein the gate is an AND gate.

6. The power supply apparatus of claim 2, wherein the low frequency signal has a frequency between 1 Hz and 100 Hz.

7. The power supply apparatus of claim 2, wherein the high frequency signal has a frequency between 1 kHz and 1 MHz.

8. The power supply apparatus of claim 1 wherein the transformer is connected in a flyback mode.

9. The power supply apparatus of claim 1 wherein the transformer is a step-up transformer having a turns ratio of 1:8.33.

10. The power supply apparatus of claim 1 wherein the first switch and the second switch are field effect transistors.

11. The power supply apparatus of claim 1, wherein the signal generator is a microprocessor.

12. The power supply apparatus of claim 1, wherein the rectifier filter comprises a diode coupled to a capacitor.

13. A method for supplying power to a telephone alerting mechanism, the method comprising the steps of:

(a) generating a low voltage alternating current from a low voltage direct current source;

(b) transforming the low voltage alternating current to a high voltage alternating current;

(c) converting the high voltage alternating current into a high voltage direct current; and (d) alternately supplying the high voltage direct current and supplying an energy discharge path to the telephone alerting mechanism.

14. The method of claim 13, wherein step (a) further comprises:

(a1) generating a control signal;

(a2) varying an impedance in response to the control signal; and (a3) generating a low voltage alternating current, from a low voltage direct current, in response to the varying impedance.

15. The method of claim 14, wherein the step (a1) further comprises:

generating a high frequency signal;

generating a low frequency signal; and combining the high frequency signal with the low frequency signal to form the control signal.

16. The method of claim 13, wherein step (c) further comprises:

rectifying and filtering the high voltage alternating current to convert the high voltage alternating current into a high voltage direct current.

17. The method of claim 13, wherein step (d) further comprises:

(d1) generating a reversing switch signal;

(d2) supplying the high voltage direct current to the alerting mechanism during a first duration of the reversing switch signal; and (d3) supplying the energy discharge path to the alerting mechanism during a second duration of the reversing switch signal.

18. The method of claim 17, wherein the reversing switch signal is generated by inverting a low frequency signal.

19. The method of claim 17, further comprising:

reversing the direction of current flow in a load impedance during the second duration of the reversing switch signal.

20. A power supply apparatus for energizing an alerting mechanism, the power supply apparatus being couplable to a low voltage current source and to an alerting mechanism, the power supply apparatus comprising:

a signal generator having means to generate a control signal and a reversing switch signal;

a first switch coupled to the signal generator, the first switch having means to open and close in response to the control signal;

a transformer having a primary winding and a secondary winding, the primary winding having means to connect to the low voltage direct current source, the primary winding further coupled to the first switch, such that in the presence of the low voltage direct current source, the opening and closing of the first switch generates a time varying current in the primary winding and thereby inducing a high voltage alternating current across the secondary winding;

a rectifier filter coupled in parallel to the secondary winding to produce a high voltage direct current in the presence of the high voltage alternating current across the secondary winding; and a second switch coupled to the signal generator, further coupled to the rectifier filter and couplable to a ringer circuit, the second switch further having means to open and close in response to the reversing switch signal, thereby alternately furnishing energy to and discharging energy from the alerting mechanism.

21. The power supply apparatus of claim 20, wherein the signal generator comprises:

a high frequency generator;

a low frequency generator;

a gate coupled to the high frequency generator and to the low frequency generator, the gate having a gate output providing the control signal; and an inverter coupled to the low frequency generator, the inverter having an output providing the reversing switch signal.

22. The power supply apparatus of claim 21, wherein the gate is an AND gate.

23. The power supply apparatus of claim 21, wherein the low frequency generator has means to provide an output signal having a frequency between 1 Hz and 100 Hz.

24. The power supply apparatus of claim 21, wherein the high frequency generator has means to provide an output signal having a frequency between 1 kHz and 1 MHz.

25. The power supply apparatus of claim 20, wherein the transformer is connected in a flyback mode.

26. The power supply apparatus of claim 20, wherein the transformer is a step-up transformer having a turns ratio of 1:8.33.

27. The power supply apparatus of claim 20, wherein the first switch and the second switch are field effect transistors.

28. The power supply apparatus of claim 20, wherein the signal generator is a microprocessor.

29. The power supply apparatus of claim 20, wherein the rectifier filter comprises a diode coupled to a capacitor.

30. A power supply apparatus in a data communications device for energizing telephone alerting mechanisms, the data communications device capable of receiving an incoming telephone call for transmitting data, the power supply apparatus being couplable to a low voltage direct current source to provide energy to the power supply apparatus, the power supply apparatus further couplable to a telephone alerting mechanism, the power supply apparatus comprising:

a high frequency generator having an output providing a high frequency signal between 1 kHz and 1 MHz;

a low frequency generator having an output providing a low frequency signal between 1 Hz and 100 Hz;

an AND gate having a first input coupled to the high frequency generator output, having a second input coupled to the low frequency generator output, the AND gate further having an output providing a control signal;

an inverter having an input coupled to the low frequency generator output, the inverter further having an output providing a reversing switch signal;

a first field effect transistor having a gate electrode coupled to the output of the AND gate for receiving the control signal, the first field effect transistor having first and second electrodes and further having a channel between the first and second electrodes, the impedance of the channel between the first and second electrodes of the first field effect transistor varying in response to the control signal, the first electrode of the first field effect transistor further coupled to a common ground;

a step-up transformer having a turns ratio of 1:8.33, the transformer further having a primary winding and a secondary winding connected in a flyback mode, the primary winding having a first end and a second end, the first end of the primary winding couplable to the low voltage direct current source, the second end of the primary winding coupled to the second electrode of the first field effect transistor, such that in the presence of the low voltage direct current source, the varying of the impedance of the channel of the first field effect transistor generates a time varying current in the primary winding and thereby inducing a high voltage alternating current across the secondary winding;

a diode coupled to a capacitor to form a rectifier filter, the rectifier filter coupled in parallel to the secondary winding to produce a high voltage direct current in the presence of the high voltage alternating current across the secondary winding; and a second field effect transistor having a gate electrode coupled to the output of the inverter for receiving the reversing switch signal, the second field effect transistor having first and second electrodes and further having a channel between the first and second electrodes, the first and second electrodes of the second field effect transistor further coupled to the rectifier filter and couplable to an alerting mechanism, the impedance of the channel between the first and second electrodes of the second field effect transistor varying in response to the reversing switch signal, thereby providing the high voltage direct current to the alerting mechanism and alternately discharging energy from the alerting mechanism.

* * * * *

UNITED STATES PATENT AND TRADEMARK OFFICE
CERTIFICATE OF CORRECTION

PATENT NO. : 5,555,301
DATED : September 10, 1996
INVENTOR(S) : Barry Boike, Cullman, AL It is certified that error appears in the above-indentified patent and that said Letters Patent is hereby corrected as shown below:

ABSTRACT

Line 3 reads                         should read
    "telephone danger"                   "telephone ringer"

Signed and Sealed this

Eighth Day of December, 1998

Attest:

BRUCE LEHMAN

Attesting Officer            Commissioner of Patents and Trademarks